(12) United States Patent
Bohen et al.

(10) Patent No.: US 8,019,663 B1
(45) Date of Patent: Sep. 13, 2011

(54) TRANSPORTATION WITHDRAWAL AND REBALANCE OF CASH HANDLING DEVICE

(75) Inventors: Daniel C. Bohen, Charlotte, NC (US); Amy Baker Folk, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 392 days.

(21) Appl. No.: 12/183,737

(22) Filed: Jul. 31, 2008

(51) Int. Cl.
*G06Q 30/00* (2006.01)

(52) U.S. Cl. ............... 705/30; 705/21; 705/17; 705/39; 705/43; 705/413; 382/135; 235/379

(58) Field of Classification Search .................... 705/39, 705/43, 30; 235/380; 382/135; 194/200
See application file for complete search history.

(56) References Cited

U.S. PATENT DOCUMENTS

| | | | | |
|---|---|---|---|---|
| 5,864,826 | A * | 1/1999 | Awatsu et al. | 705/35 |
| 7,000,778 | B2 * | 2/2006 | Omori et al. | 209/534 |
| 7,522,880 | B2 * | 4/2009 | Stieber et al. | 455/41.2 |
| 7,548,885 | B2 | 6/2009 | Dutta et al. | |
| 2002/0092905 | A1 * | 7/2002 | Katou et al. | 235/379 |
| 2005/0173515 | A1 | 8/2005 | Sawa | |
| 2007/0045397 | A1 * | 3/2007 | Ireland et al. | 235/379 |
| 2009/0192938 | A1 * | 7/2009 | Amos | 705/43 |
| 2009/0319080 | A1 * | 12/2009 | Utsumi et al. | 700/231 |
| 2009/0320106 | A1 * | 12/2009 | Jones et al. | 726/5 |
| 2010/0065623 | A1 * | 3/2010 | Sauter | 232/1 D |

FOREIGN PATENT DOCUMENTS

| | | |
|---|---|---|
| DE | 102006040780 A1 | 3/2008 |
| WO | 2004081779 A | 9/2004 |

OTHER PUBLICATIONS

International Search Report and Written Opinion for International Application No. PCT/US2009/058601, mailed Jan. 8, 2010, 11 pages.
Non-Final Office Action of related U.S. Appl. No. 12/241,196, mailed Jul. 21, 2010, 7 pages.

* cited by examiner

*Primary Examiner* — Vanel Frenel
(74) *Attorney, Agent, or Firm* — Banner & Witcoff, Ltd.; Michael A. Springs

(57) ABSTRACT

A method, apparatus, computer-readable medium and system are disclosed that provide for rebalancing/reallocating funds within a cash handling device. The cash handling device may include one or more stackers, cartridges, rollers, or the like. Service personnel may (manually) extract from the cash handling device an amount of cash. The cash handling device is configured to internally recount an amount of cash remaining within the cash handling device, thereby precluding of a need for service personnel to redeposit funds intended to remain in the cash handling device. Service personnel may also (manually) deposit into the cash handling device an amount of cash in order to replenish the cash handling device. One or more confirmations may be generated to indicate an amount of cash removed from and deposited into the cash handling device. In some embodiments, the cash handling device (automatically) extracts cash to service personnel as a withdrawal or (automatically) accepts cash from service personnel as a deposit.

24 Claims, 7 Drawing Sheets

US 8,019,663 B1

TRANSPORTATION WITHDRAWAL AND REBALANCE OF CASH HANDLING DEVICE

FIELD

Aspects of the present disclosure relate to a cash handling device. More specifically, aspects of the invention relate to rebalancing funds remaining in a cash handling device when performing a withdrawal or a deposit.

BACKGROUND

It is generally desirable to maintain at least a minimum amount of cash in a cash handling device in order to ensure a sufficient amount of cash is available on-hand for (customer) withdrawal. On the other hand, it is generally desirable to ensure that the amount of cash within a cash handling device does not exceed a maximum level because the cash handling device either is physically incapable of holding an amount of cash in excess of the maximum level, or exceeding the maximum level imposes an increased security risk (e.g., the cash handling device increasingly becomes an inviting target of a robber/thief).

Conventional techniques for servicing a cash handling device include opening the cash handling device, removing cash from cash stackers or rollers such as rolled stored modules (RSMs), and closing/re-sealing the cash handling device.

There are a number of disadvantages associated with the conventional technique described above. When service personnel manually withdraw funds from a cash handling device, or add funds for purposes of replenishing a cash handling device, there is a relatively high likelihood of error due to human error. Furthermore, there is an accompanying cost to service personnel in terms of increased risk of potential robberies, extra security measures that need to be taken to mitigate the risk, and increased loss of money when such robberies do occur in view of the physical handling of funds.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects described herein are directed to a novel apparatus, method and system for withdrawing cash from a stacker-type cash handling device and rebalancing a remaining cash supply. More specifically, service personnel may extract a portion of funds from a cash handling device and rebalance/reallocate remaining funds to appropriate stacks without requiring the cash handling device (or more specifically, the stackers) to be (completely) emptied.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

In one aspect of the invention, an end-to-end currency, handling and servicing device is provided to any cash-centric business or enterprise. In various embodiments, the method, apparatus, and system may provide cash handling device set up and balancing, back office reconciliation, and other cash payment handling activities.

In an aspect of the invention, a cash handling device signals when the device requires servicing due to exceeding a maximum threshold with respect to an amount of funds currently present in the device, or when an amount of cash in one or more stackers falls below a designated reserve level. In some embodiments, once the cash handling device has been serviced, the signal related to the need for servicing may be removed and the cash handling device may (automatically) determine a new balance with respect to an amount of funds remaining in the device.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for providing currency handling services. A cash handling device such as a cash recycler may provide for fund rebalance/reallocation on a remaining portion of funds following a withdrawal using the currency handling apparatus, system, and method described below in various aspects of the invention. For illustrative purposes the financial instrument discussed throughout the below description is cash. However, as those skilled in the art will realize, the described aspects of the invention are not limited to just cash (paper money and coins), but may also include other forms of liquid assets such as checks, bank notes, and money orders.

Figure 1:
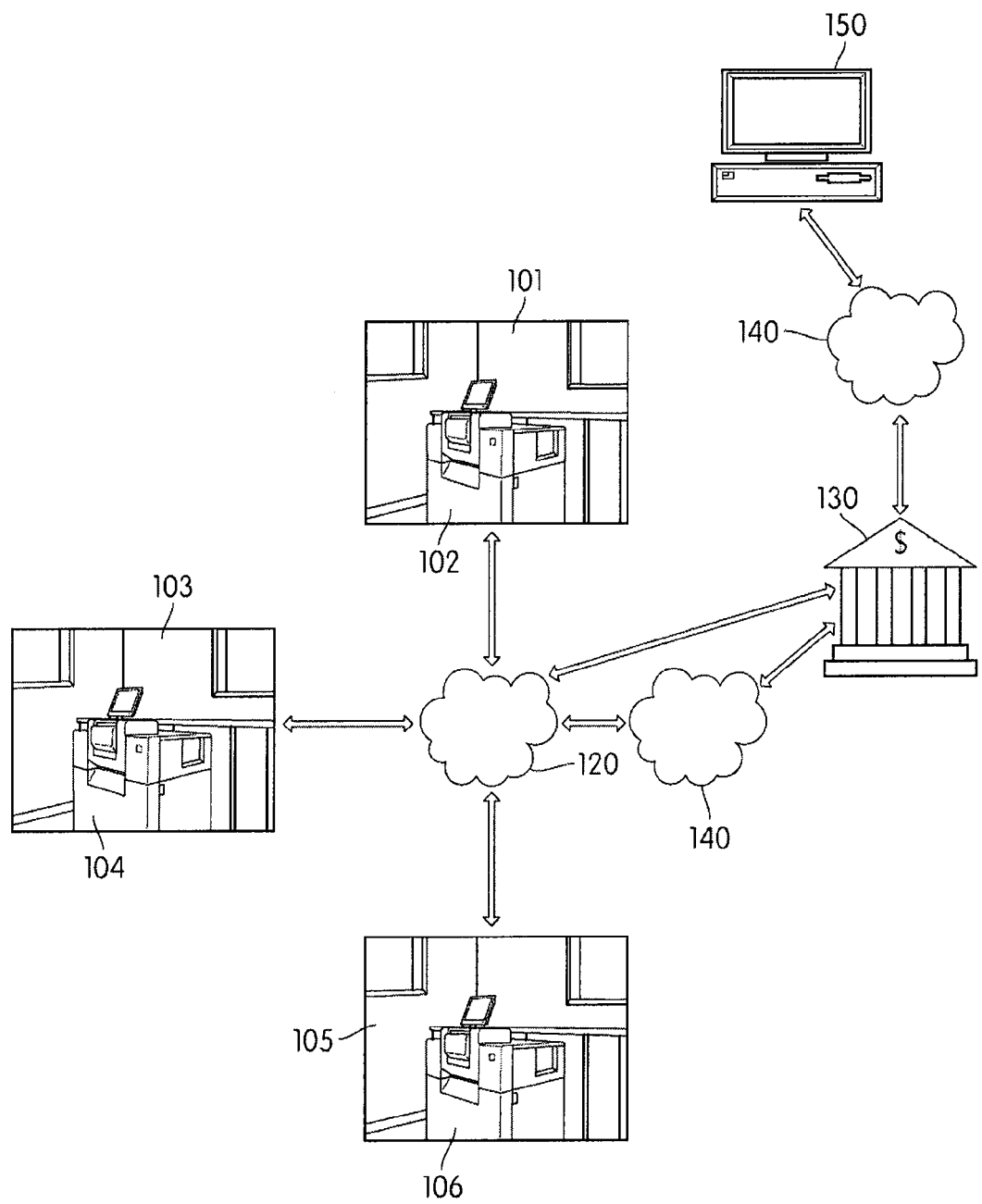
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
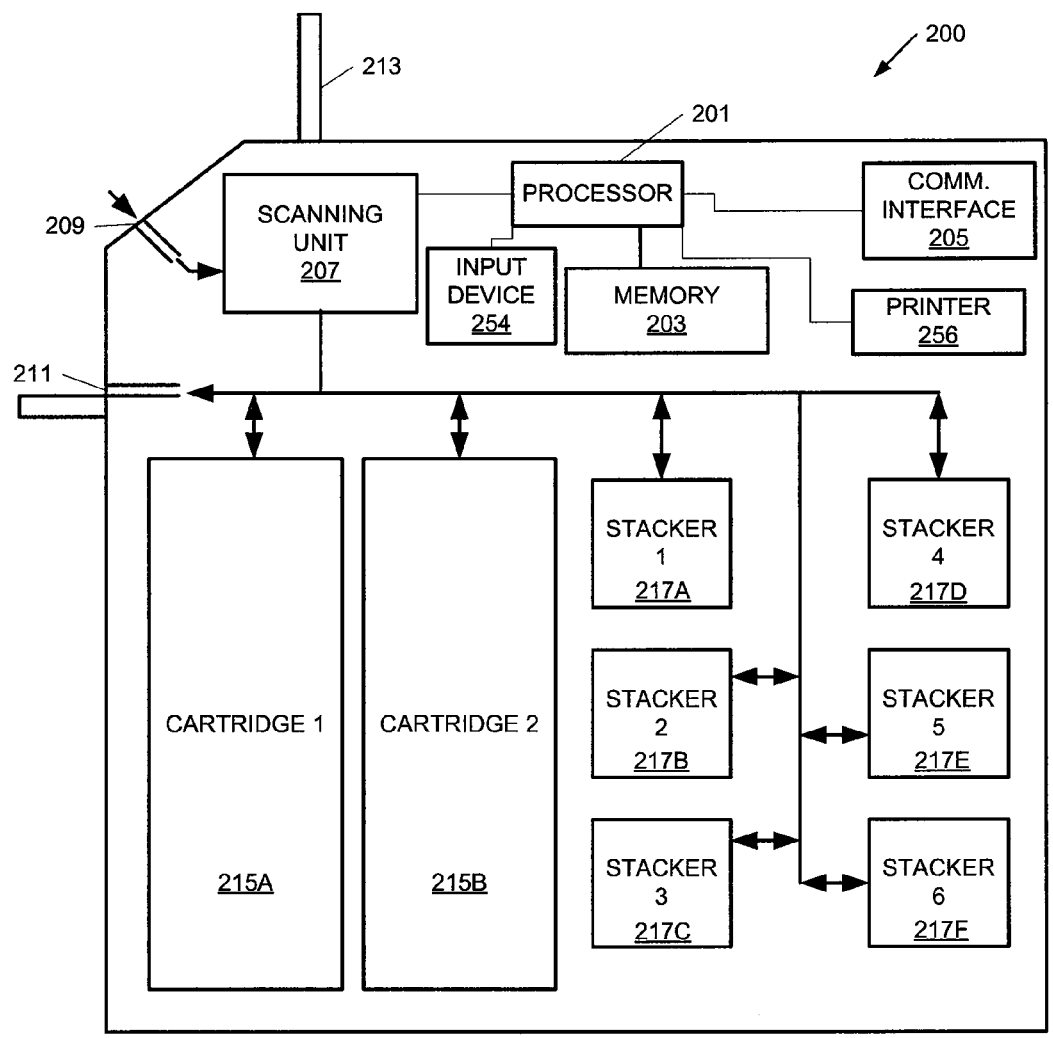
FIG. 2 illustrates a simplified diagram of a cash recycler in which various aspects of the disclosure may be implemented.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and stackers 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
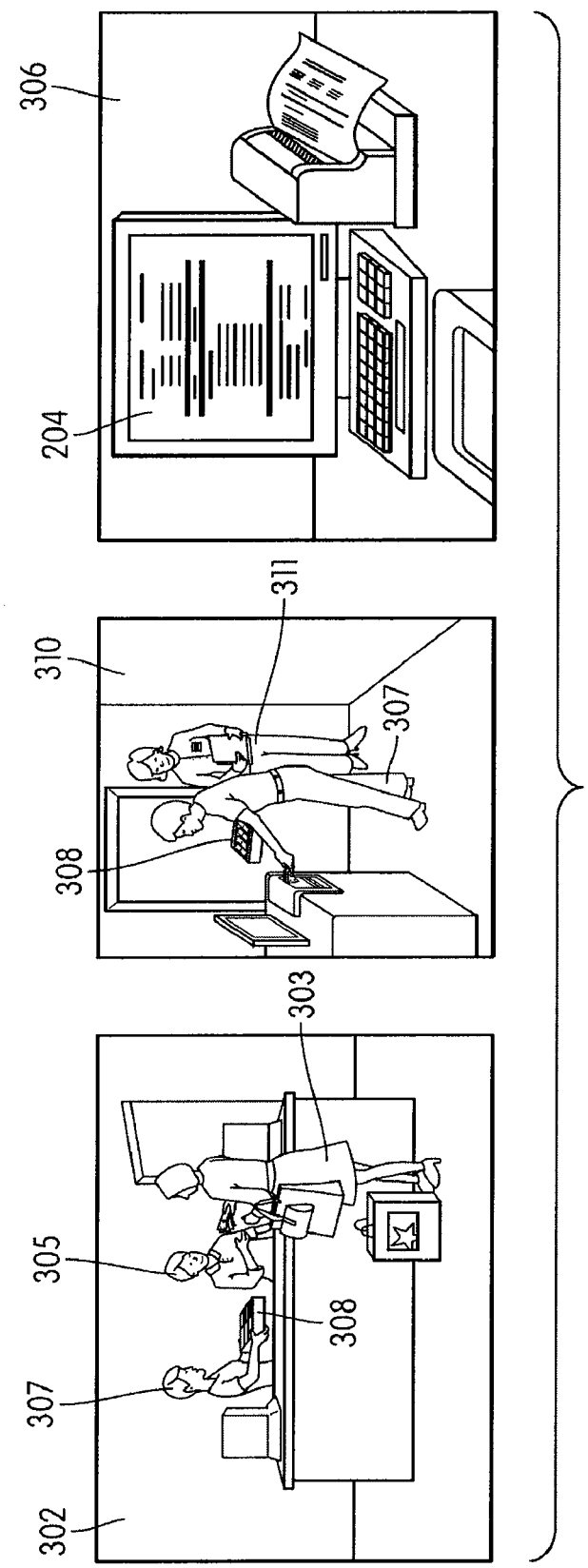
FIG. 3 illustrates various features of a cash recycler in which various aspects of the disclosure may be implemented.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
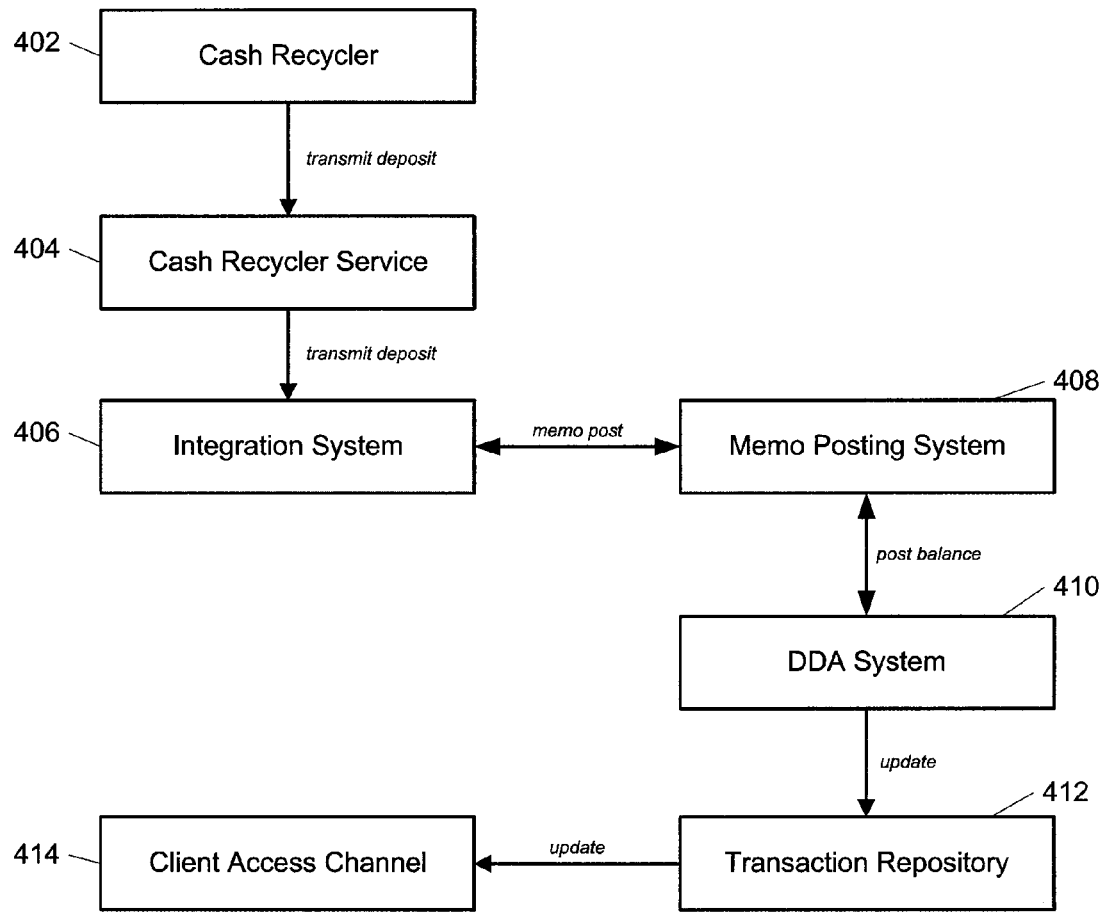
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
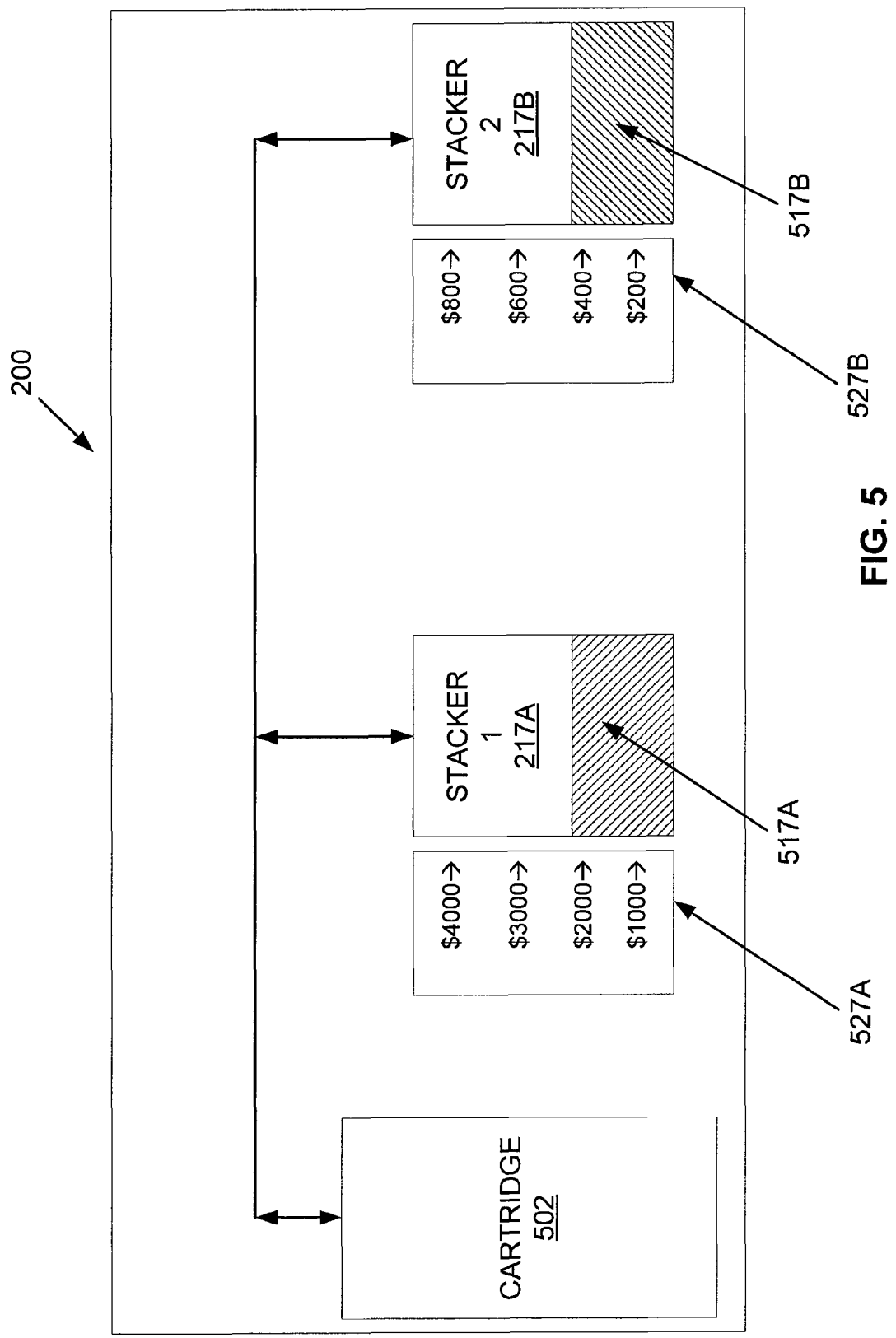
FIG. 5 illustrates a simplified diagram of a cash recycler in which various aspects of the disclosure may be implemented.

FIG. 5 illustrates a simplified diagram of cash recycler 200. In FIG. 5, the recycler is shown as including stackers 217A-217B of FIG. 2 and cartridge 502. In some embodiments, cartridge 502 is one of cartridges 215A-215B of FIG. 2. In other embodiments, cartridge 502 is in addition to cartridges 215A-215B. In FIG. 5, stackers 217A-217B are shown as being comprised of reserve regions 517A-517B, respectively. The heights or depths of reserve regions 517A-517B represent a minimum amount of cash intended to be maintained within each of stackers 217A-217B after cash recycler 200 has been serviced.

In some embodiments, the heights or depths associated with reserve regions 517A-517B may (simply) be a conceptual representation, wherein a person servicing cash recycler 200 estimates an appropriate amount of cash to be left behind in each of stackers 217A-217B. In other embodiments, stackers 217A-217B may be fabricated with grooves or slots, and an operator may insert a physical plate at a particular height or level of stackers 217A-217B to assist a person servicing cash recycler 200 in determining how much cash to leave behind in stackers 217A-217B. These techniques may be used to support a manual determination and extraction of cash. Alternatively, or additionally, a control module (which may include a processor such as processor 201 of FIG. 2) may be implemented in cash recycler 200 and may be used to define an appropriate amount of cash to be left in cash recycler 200 after servicing, thereby assisting service personnel in determining an amount of cash to be removed/withdrawn from cash recycler 200.

Alternatively, a measurement scale such as 527A and 527B may be used with respect to stackers 217A and 217B, respectively, to provide an approximate correlation between the height of a stack of cash within each of stackers 217A and 217B and the amount of cash in the stacker 217A, 217B. The resolutions provided with respect to measurement scales 527A and 527B are merely illustrative, and it is understood that finer or coarser resolution schemes may be used. For example, with respect to measurement scale 527A, a gradation scheme in increments of five hundred dollars ($500) may be used instead of one thousand dollars ($1000) as shown. Furthermore, tolerances may be included (not shown in FIG. 5) to provide an indication of uncertainty in the approximation. Measurement scales 527 may aid service personnel by correlating an amount of cash to be left in cash recycler 200 after servicing with the cash amount extracted as determined by the control module described above.

As described above, the height or level of cash associated with reserve regions 517A-517B may be adjusted on a manual basis (e.g., via the insertion of a physical plate). In some embodiments, cash recycler 200 (or more specifically, the control module described above) may play a role in determining an appropriate height or level. For example, cash recycler 200 may maintain an electronic calendar or the like and provide for different heights or levels based on the day of the week (e.g., extra cash may be maintained in cash recycler 200 on Saturdays and Sundays in comparison to other days of the week, or on select holidays, due to an expectation that increased amounts of withdrawals (by customers) will be demanded on those select days). In some embodiments, cash recycler 200 may include additional hardware, software, firmware or the like to compute recent trends with respect to withdrawals and adjust the height or level associated with reserve regions 517A-517B accordingly. Alternatively, cash recycler 200 may receive one or more messages, commands, directives or the like from a computing device (e.g., a mobile terminal, a server, etc.) to adjust a height or level associated with reserve regions 517A-517B.

After service personnel complete servicing cash recycler 200 by closing/re-sealing a door or panel on cash recycler 200, it may be desirable to rebalance/reallocate the remaining funds in cash recycler 200 to provide for a complete accounting. For example, with respect to FIG. 5, service personnel may take cash from stackers 217A-217B, leaving behind an amount of cash equal to the heights/levels indicated by reserve regions 517A-517B, respectively. Service personnel may also deposit funds (into cartridge 502 or stackers 217A-217B, for example) for purposes of replenishing stackers 217, particularly when an amount of cash in a stacker 217 falls below the height of its associated reserve region 517.

In some embodiments, stackers 217 are configured with scales or the like that measure weight and compute an amount of cash left behind in reserve regions 517A-517B based on the measured weight (e.g., by dividing each measured weight by the weight per bill).

In alternative embodiments, cash within reserve regions 517A-517B may be counted by displacing all of the remaining cash in recycler 200 from stackers 217 to a cartridge (e.g., cartridge 502), and then returning the cash from the cartridge to the appropriate stackers 217. The actual counting operation may be performed when the cash is (initially) moved from stackers 217 to cartridge 502. Alternatively, or additionally, the counting operation may be performed when the cash is returned from cartridge 502 to stackers 217. In some embodiments it may be desirable to count both when moving cash from stackers 217 to cartridge 502 and when moving the cash back from cartridge 502 to stackers 217 in order to improve reliability or accuracy. For example, while servicing cash recycler 200, service personnel may place a denomination of cash intended for a first stacker (e.g., stacker 217A) in a second stacker (e.g., stacker 217B) by accident. Accordingly, counting the displaced cash moved from the stackers to the cartridge may assist in reconciling this discrepancy. More generally, counting the amount of cash displaced out of or into stackers 217 may be used to determine an amount of funds withdrawn and deposited while servicing the cash recycler 200 as more fully described below. Alternatively or additionally, service personnel may extract/withdraw cash from cash recycler 200 and then re-deposit the extracted cash into cash recycler 200 (e.g., instead of moving currency only within the recycler 200). In some embodiments, the re-deposit operation takes place using an input slot (e.g., input slot 209 of FIG. 2). In other embodiments, cash recycler 200 is configured with one or more additional input slots to support such re-deposit operations.

In some embodiments, a scanner (e.g., scanning unit 207 of FIG. 2) is used to facilitate the counting operation. For example, if service personnel deposited cash in cartridge 502 for purposes of refilling/replenishing reserve regions 517A-517B, a scanner may be used to distinguish the type of cash or bill that has been provided (to determine whether a particular deposited cash bill should be routed to stacker 217A versus 217B, for example).

Figure 6A:
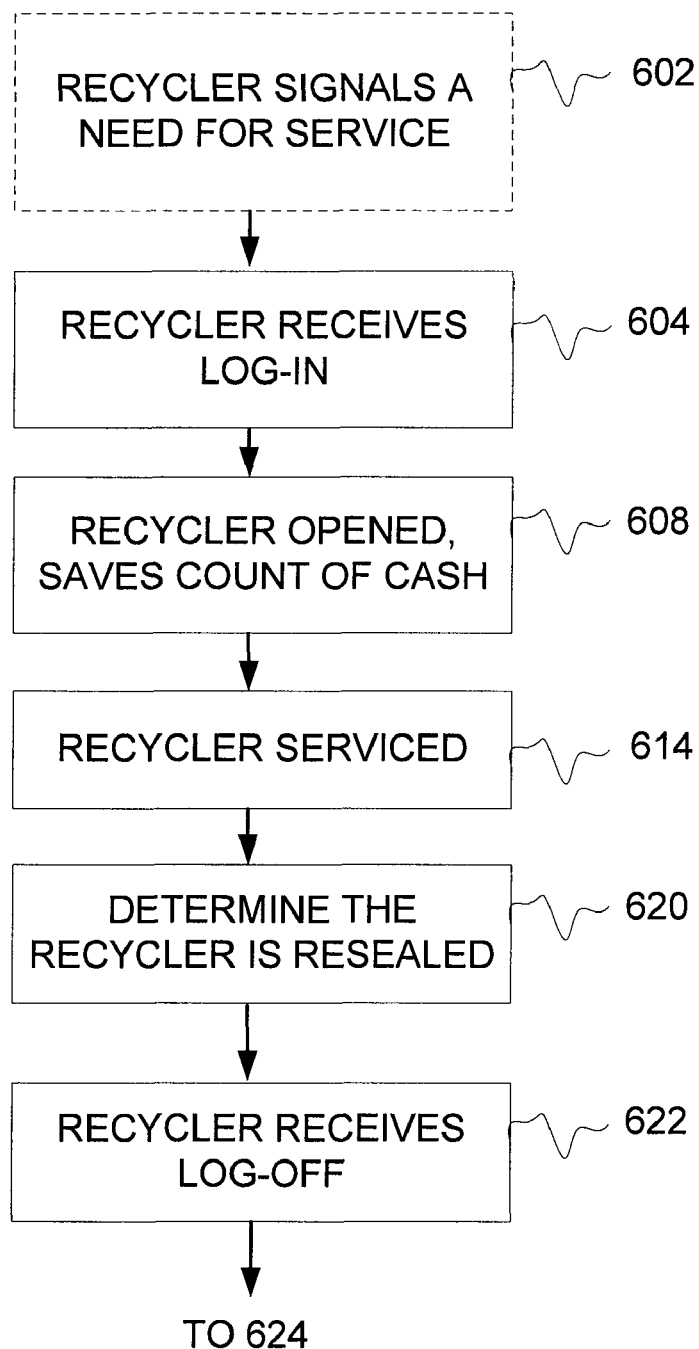
FIG. 6 illustrates a method suitable for implementing one or more aspects of the invention.
Figure 6B:
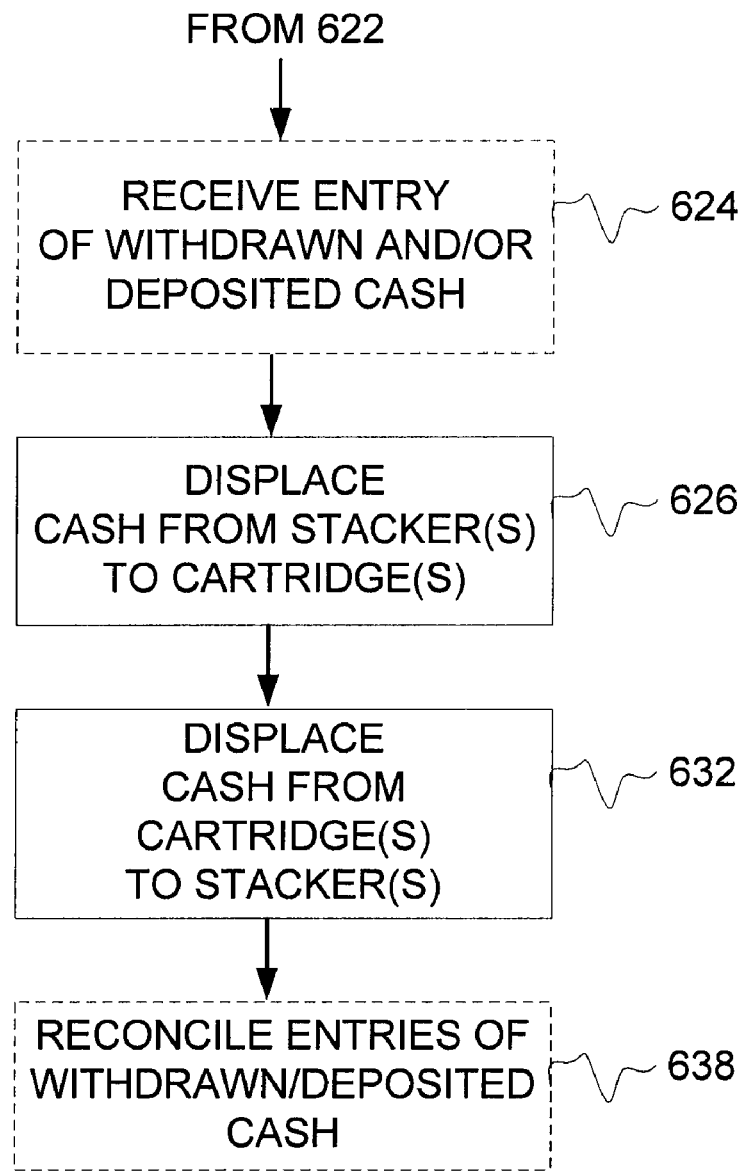

FIG. 6 illustrates a method suitable for carrying out one or more aspects of the instant disclosure. In step 602, a cash recycler (e.g., cash recycler 200 of FIG. 2 or FIG. 5) may generate a signal indicating a need for service. As described above, the signal may result from cash within stackers (e.g., stackers 217) falling below a threshold level established by reserve regions (e.g., reserve regions 517A or 517B associated with FIG. 5) or a projection of a level of currency dropping below the threshold level. Alternatively, or additionally, the signal may be the result of a net excess of cash (beyond a threshold) having been deposited within the cash recycler (or one or more of stackers 217) since the last time the cash recycler was serviced. In some embodiments, step 602 is optional (as indicated by the broken/dashed lines associated with the box corresponding to step 602 in FIG. 6). For example, service personnel may routinely service a cash recycler before the cash recycler has an opportunity to approach capacity or threshold (e.g., reserve region 517) limits, thereby precluding the need to provide for such signaling in those embodiments.

In step 604, service personnel may provide log-in information to the cash recycler. For example, in accordance with step 604, service personnel may provide any preliminary information regarding the service personnel's identity (e.g., using a name, Personal Identification Number (PIN), finger-print analysis, retinal scan, RFID tag scan or the like) and/or the servicing operation to be performed. Responsive to the entry of such information, the cash recycler (or another computing entity) may verify and grant access to service personnel to perform an authorized servicing operation. If the entered information is incorrect, a warning message or the like may be displayed advising service personnel to reenter the information. If a number of attempts to log-in are unsuccessful, the cash recycler may prohibit further attempts to log-in and enter a lock-down mode; repeated failures may be construed in some embodiments as an unauthorized attempt at obtaining access to the cash recycler.

In step 608, service personnel opens the cash recycler. Opening the cash recycler may include turning a key, entering a password or the like to provide for authorization/security. As part of step 608 (or prior to step 608, i.e., as a part of step 604) the cash recycler may save/status in memory (e.g., memory 203 of FIG. 2) the amount of cash in the cash recycler for purposes of reconciliation and generating confirmation(s) as will be described more fully below.

In step 614 service personnel services the cash recycler. Step 614 may include service personnel removing cash from the cash recycler (e.g., removing cash from one or more stackers 217 or rollers such as rolled stored module(s) (RSMs)) as a (manual) withdrawal. Step 614 may also include service personnel (manually) depositing cash into the cash recycler (or more specifically, depositing cash into a cartridge such as cartridge 502 of FIG. 5, depositing cash into one or more stackers 217, or depositing cash into one or more RSMs). In alternative embodiments, rather than having service personnel manually withdraw or deposit cash, cash recycler 200 is configured to automatically extract (as a withdrawal) or accept (as a deposit) cash to/from service personnel. Thus, cash recycler 200 may, for example, automatically determine and dispense the amount of funds to be given to the transport carrier or other service personnel without the service personnel having to manually extract the funds from within recycler 200. Withdrawal slot 211 and input slot 209 of FIG. 2 may be used for these operations, or cash recycler 200 may be configured with additional slots to support these operations. In these alternative embodiments, it might not be necessary to physically open the cash recycler as described in step 608, thereby enhancing security and minimizing an amount of cash that is potentially exposed.

In step 620 service personnel completes servicing the cash recycler by closing/resealing the cash recycler. The step of resealing the cash recycler may include turning a key, entering a password, or providing some other type of verification that the cash recycler is completely shut and secured.

In step 622, service personnel may log-off of the cash recycler to serve as an indication (in addition to closing/resealing the cash recycler in step 620) that the service personnel deems the servicing operation to have been completed. A log-off command may require service personnel to take an affirmative action (e.g., turning a key to place a lock associated with the cash recycler in a locked state, entering a password, PIN number, or the like). Alternatively, a log-off command may be inferred based on a lack of activity (e.g., a timeout) or a (previous) sequence of steps having been successfully completed. Inferring a log-off command may help to ensure that service personnel do not remain liable for funds because the service personnel forgot to affirmatively engage in a log-off, as well as providing increased security with respect to cash remaining in the cash recycler after servicing.

In (optional) step 624, the cash recycler may receive a numerical data entry corresponding to what service personnel asserts is an amount that was withdrawn from or deposited into the cash recycler during servicing in accordance with step 614. The entry of numerical data may take place using one or more keyboards, touchscreens or other input device(s) associated with the cash recycler. Alternatively, or additionally, service personnel may use another computing device (e.g., a mobile terminal) for purposes of entering the numerical data. Service personnel may enter a total amount withdrawn and a total amount deposited, or may enter the data with respect to each cash denomination (e.g., withdrew X five dollar bills, withdrew Y ten dollar bills, deposited Z twenty dollar bills, where X, Y, and Z are integers). Step 624 is optional in the sense that the control module described above may have already determined the amount to retain within the cash recycler after servicing as well as the amount to be withdrawn, however, it is understood that step 624 may be implemented to improve reliability and to guard against a potential cash recycler failure. The data entry may be used to perform reconciliation as described below with respect to step 638.

In step 626 the cash recycler displaces cash from one or more stackers (e.g., stackers 217 of FIGS. 2 and 5) to one or more cartridges (e.g., cartridge 502 of FIG. 5) responsive to the cash recycler being resealed in step 620. A counting operation may be conducted as described above when displacing the cash in accordance with step 626. The cash recycler may subtract the count of cash displaced in step 626 from the count of cash saved in step 608 to determine a (net) amount of cash that service personnel removed as a withdrawal. For example, if in the process of servicing the cash recycler as described above with respect to step 614 service personnel withdrew B five dollar bills from stacker 217B, and deposited C five dollar bills into stacker 217B, the net amount withdrawn with respect to the number of five dollar bills would be B−C, where B and C are integers. Moreover, one of skill in the art would appreciate that the sign (e.g., + or −) of the result of B-C indicates whether a net amount of five dollar bills was deposited or withdrawn with respect to a given stacker (e.g., stacker 217B in this example).

In step 632, the cash recycler displaces the cash, but this time from the one or more cartridges to the one or more stackers. A counting operation may take place to determine an amount of cash displaced from the one or more cartridges to the one or more stackers. The cash that is placed in the one or more stackers during step 632 may include the cash that was displaced from the one or more stackers to the one or more cartridges in step 626 plus any additional cash that may have been deposited into the one or more cartridges by service personnel. As such, in accordance with step 632 the cash recycler may subtract the count of cash displaced in step 626 from the count of cash displaced in step 632 to determine an amount of cash that service personnel deposited into the one or more cartridges. After completing step 632, an amount of cash within the cash recycler will be rebalanced for future operations (e.g., future iterations of the method of FIG. 6).

It is understood that step 626 (and step 632) may automatically take place internal to the cash recycler, thus precluding of a need on the part of service personnel to remove cash that is intended to remain in the cash recycler after servicing. That is, cash may automatically be displaced between one or more stackers 217, one or more cartridges, or RSMs (e.g., once service personnel have completed servicing the cash recycler as per step(s) 620 and/or 622 above). Accordingly, since human intervention might not be required, the activities associated with step 626 (and step 632) may be triggered after a specified event (e.g., a net amount of funds withdrawn or deposited from the cash recycler exceeding a threshold value) or on a regular schedule.

One or more confirmations may be generated in the form of a report, receipt, e-mail, auditory indicator, or the like. The one or more confirmations may indicate an amount of cash removed from the cash recycler by service personnel as a withdrawal (as described above with respect to step 626), an amount of cash placed into the cash recycler by service personnel as a deposit (as described above with respect to step 632), and the total amount of rebalanced funds remaining in the cash recycler after servicing. The one or more confirmations may (simply) provide the total amounts withdrawn, deposited, and rebalanced, or may optionally provide details as to an amount with respect to each stacker 217 or bill (e.g., the one or more confirmations may indicate the number of five dollar ($5) bills withdrawn and deposited by service personnel). As shown in (optional) step 638, a reconciliation process may take place to determine whether the (counted) amount of funds withdrawn/deposited in accordance with steps 626 and/or 632 corresponds to the numerical values entered in step 624. As part of step 638, one or more confirmations may be generated to indicate whether cash has been (successfully) reconciled. One skilled in the art would appreciate that step 638 may be used to identify discrepancies immediately, allowing corrective action to be taken within a relatively prompt time frame should there be an indication of an error.

In those embodiments where the recycler signals a need for service in accordance with step 602, the signal may be deasserted once service personnel has completed servicing the recycler, assuming that service personnel has either withdrawn or deposited an appropriate amount of cash such that the signaling condition is no longer present. As such, the deassertion of the signal may serve as (further) confirmation that the recycler has been serviced in an appropriate manner to remove the condition that was responsible for generating the asserted signal in step 602.

The method of FIG. 6 was described above in the context of a cash recycler having stacker(s) and cartridge(s). It is understood that a cash recycler may be configured with additional modules or circuitry, and that the method of FIG. 6 may be adapted to accommodate different configurations or platforms. For example, the method of FIG. 6 may be adapted to support a cash recycler configured with rollers such as RSMs by modifying the displacement/counting operations associated with step 626 (and step 632).

One or more manual override operations are available in some embodiments that are used to override the results (e.g., the counts, calculations, or signals) generated by the cash recycler. Authorization in the form of a key, password, or the like may be required to override the results generated by the cash recycler. The override operations may be used in some embodiments when a known error or bug exists with respect to a given cash recycler, the override operations may serve as a "patch" until more permanent corrective action can be taken with respect to the cash recycler. As such, the override operations may be used to ensure that a cash recycler can continue to remain in operation for "normal" use by customers/consumers. The override operations may be conducted pursuant to one or more override commands.

One of skill in the art will appreciate that the operations, calculations, and computations described herein may take place based on units of counts or amounts in terms of currency/cash. For example, one of skill in the art will appreciate that if a cash recycler has a count of U five dollar bills, the cash recycler has $(U×5) in terms of cash value. More generally, the amount of cash is the product of the number of bills of a given denomination multiplied by the value per bill. Accordingly, the terms "count" and "amount" are used throughout this disclosure interchangeably, recognizing that the two terms are synonymous and simply different ways to express the same quantity.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. The functionality may be resident in a single computing device, or may be distributed across multiple computing devices/platforms, the multiple computing devices/platforms optionally being connected to one another via one or more computing networks. In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
   determining that a count of cash has been at least one of: withdrawn from or deposited into a cash handling device during a servicing operation;
   determining that the servicing operation is complete;
   responsive to determining that the servicing operation is complete, automatically displacing cash from at least one stacker to at least one cartridge; and
   counting the cash displaced from the at least one stacker.

2. The method of claim 1, further comprising:
   generating a signal indicating that the cash handling device requires service.

3. The method of claim 1, further comprising:
   generating a confirmation indicating a count of cash in the cash handling device based on the count of cash displaced from the at least one stacker.

4. The method of claim 1, further comprising:
   receiving input indicating a count of cash that a user asserts has been at least one of: withdrawn from or deposited into the cash handling device during the servicing operation.

5. The method of claim 4, further comprising:
   saving a count of cash in the cash handling device immediately prior to the servicing operation; and
   determining whether the saved count of cash and the count of cash displaced from the at least one stacker reconciles with the received input.

6. The method of claim 5, further comprising:
   generating a confirmation indicating a status of the reconciliation.

7. The method of claim 1, further comprising:
   receiving at least one override command; and
   overriding the count of cash displaced from the at least one stacker to the at least one cartridge based on the at least one override command.

8. The method of claim 1, further comprising:
   automatically displacing cash from the at least one cartridge to the at least one stacker; and
   counting the cash displaced from the at least one cartridge.

9. The method of claim 8, further comprising:
   determining a count of cash deposited into the at least one cartridge by subtracting the count of cash displaced from the at least one stacker from the count of cash displaced from the at least one cartridge.

10. The method of claim 1, further comprising:
    receiving log-in information related to the servicing operation;
    verifying the log-in information; and
    responsive to verifying the log-in information, granting access to the cash handling device to perform the servicing operation.

11. The method of claim 1, wherein the determining that the servicing operation is complete includes receiving a log-off command.

12. An apparatus comprising:
    at least one stacker;
    at least one cartridge;
    a processor; and
    a memory storing computer-executable instructions that, when executed by the processor, cause the apparatus to perform:
       determining that a count of cash has been at least one of: withdrawn from or deposited into a cash handling device during a servicing operation;
       determining that the servicing operation is complete;
       responsive to determining that the servicing operation is complete, automatically displacing cash from at least one stacker to at least one cartridge; and
       counting the cash displaced from the at least one stacker.

13. The apparatus of claim 12, wherein the computer-executable instructions further include at least one instruction that, when executed by the processor, causes the apparatus to perform:
    generating a signal indicating that the apparatus requires service.

14. The apparatus of claim 12, wherein the computer-executable instructions further include at least one instruction that, when executed by the processor, causes the apparatus to perform:
    generating a confirmation indicating a count of cash in the apparatus based on the count of cash displaced from the at least one stacker.

15. The apparatus of claim 12, wherein the computer-executable instructions further include at least one instruction that, when executed by the processor, causes the apparatus to perform:
    receiving input indicating a count of cash that a user asserts has been at least one of: withdrawn from or deposited into the apparatus during the servicing operation.

16. The apparatus of claim 15, wherein the computer-executable instructions further include at least one instruction that, when executed by the processor, causes the apparatus to perform:
    saving a count of cash in the apparatus immediately prior to the servicing operation; and
    determining whether the saved count of cash and the count of cash displaced from the at least one stacker reconciles with the received input.

17. The apparatus of claim 12, wherein the computer-executable instructions further include at least one instruction that, when executed by the processor, causes the apparatus to perform:
- automatically displacing cash from the at least one cartridge to the at least one stacker; and
- counting the cash displaced from the at least one cartridge.

18. The apparatus of claim 17, further comprising:
- determining a count of cash deposited into the at least one cartridge by subtracting the count of cash displaced from the at least one stacker from the count of cash displaced from the at least one cartridge.

19. A non-transitory computer-readable medium configured to store computer-executable instructions that, when executed, cause a cash handling device to perform:
- determining that a count of cash has been at least one of: withdrawn from or deposited into the cash handling device during a servicing operation;
- determining that the servicing operation is complete;
- responsive to determining that the servicing operation is complete, automatically displacing cash from at least one stacker to at least one cartridge;
- automatically displacing cash from the at least one cartridge to the at least one stacker; and
- counting the cash displaced from the at least one cartridge to the at least one stacker.

20. The computer-readable medium of claim 19, wherein the computer-executable instructions include at least one instruction that, when executed, cause the cash handling device to perform:
- saving a count of cash in the cash handling device immediately prior to the servicing operation; and
- determining a net count of cash deposited into the cash handling device by subtracting the saved count of cash from the count of cash displaced from the at least one cartridge to the at least one stacker.

21. The computer-readable medium of claim 19, wherein the computer-executable instructions include at least one instruction that, when executed, cause the cash handling device to perform:
- counting the cash displaced from the at least one stacker to the at least one cartridge.

22. The computer-readable medium of claim 21, wherein the computer-executable instructions include at least one instruction that, when executed, cause the cash handling device to perform:
- saving a count of cash in the cash handling device immediately prior to the servicing operation; and
- determining a count of cash deposited into the at least one stacker during the servicing operation by subtracting the saved count from the count of cash displaced from the at least one stacker to the at least one cartridge.

23. The computer-readable medium of claim 21, wherein the computer-executable instructions include at least one instruction that, when executed, cause the cash handling device to perform:
- determining a count of cash deposited into the at least one cartridge during the servicing operation by subtracting the count of cash displaced from the at least one stacker to the at least one cartridge from the count of cash displaced from the at least one cartridge to the at least one stacker.

24. A method comprising:
- determining that a count of cash has been withdrawn from a cash handling device during a servicing operation;
- receiving a portion of the count of cash to be re-deposited into the cash handling device through at least one slot of the cash handling device; and
- rebalancing a count of cash remaining in the cash handling device responsive to receiving the portion of the count of cash.

* * * * *